United States Patent
Zhao et al.

(10) Patent No.: US 12,413,733 B2
(45) Date of Patent: Sep. 9, 2025

(54) CONTEXT-BASED ADAPTIVE BINARY ARITHMETIC CODING (CABAC) CONTEXT MODELING WITH INFORMATION FROM TEMPORAL NEIGHBORS

(71) Applicant: Tencent America LLC, Palo Alto, CA (US)

(72) Inventors: Xin Zhao, San Jose, CA (US); Liang Zhao, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 113 days.

(21) Appl. No.: 18/215,244

(22) Filed: Jun. 28, 2023

(65) Prior Publication Data

US 2024/0314319 A1   Sep. 19, 2024

Related U.S. Application Data

(60) Provisional application No. 63/452,379, filed on Mar. 15, 2023.

(51) Int. Cl.
*H04N 19/70* (2014.01)
*H04N 19/13* (2014.01)
(Continued)

(52) U.S. Cl.
CPC .......... *H04N 19/13* (2014.11); *H04N 19/172* (2014.11); *H04N 19/176* (2014.11); *H04N 19/184* (2014.11); *H04N 19/70* (2014.11)

(58) Field of Classification Search
CPC .... H04N 19/13; H04N 19/172; H04N 19/176; H04N 19/184; H04N 19/70
(Continued)

(56) References Cited

U.S. PATENT DOCUMENTS

| 2013/0114668 A1* | 5/2013 | Misra | H04N 19/86 |
| | | | 375/E7.126 |
| 2014/0044179 A1* | 2/2014 | Li | H04N 19/30 |
| | | | 375/240.16 |

(Continued)

OTHER PUBLICATIONS

International Search Report issued in International Application No. PCT/US2023/069370, mailed Nov. 3, 2023, 11 pages.

(Continued)

*Primary Examiner* — Albert Kir
(74) *Attorney, Agent, or Firm* — ArentFox Schiff LLP

(57) ABSTRACT

Aspects of the disclosure provide methods and apparatuses for video encoding/decoding. In some examples, an apparatus for video decoding includes processing circuitry. The processing circuitry receives coded information of a current block in a current picture from a coded video bitstream. The coded information includes a syntax element associated with the current block, the syntax element indicates a decoding parameter of the current block. The processing circuitry determines a context-based adaptive binary arithmetic coding (CABAC) context model associated with the syntax element based on at least a temporally co-located block of the current block. The temporally co-located block is in a different picture from the current picture. Further, the processing circuitry decodes the syntax element based on the CABAC context model, and reconstructs the current block based on the syntax element that is decoded based on the CABAC context model.

16 Claims, 13 Drawing Sheets

(51) Int. Cl.
*H04N 19/172* (2014.01)
*H04N 19/176* (2014.01)
*H04N 19/184* (2014.01)

(58) Field of Classification Search
USPC .................................... 375/240.02
See application file for complete search history.

(56) References Cited

U.S. PATENT DOCUMENTS

| | | | |
|---|---|---|---|
| 2021/0152823 A1* | 5/2021 | Park | H04N 19/176 |
| 2021/0160538 A1* | 5/2021 | Zhao | H04N 19/13 |
| 2022/0038686 A1 | 2/2022 | Solovyev et al. | |
| 2023/0115768 A1* | 4/2023 | Liao | H04N 19/105 |
| | | | 375/240.02 |
| 2023/0217030 A1* | 7/2023 | Li | H04N 19/176 |
| | | | 375/240.12 |

OTHER PUBLICATIONS

High Efficiency Video Coding, Rec. ITU-T H.265 v4 Dec. 2016, pp. 1-664.
ITU-T and ISO/IEC, "Versatile Video Coding", ITU-T Rec. H.266 and ISO/IEC 23090-3, 2020, pp. 1-516.

* cited by examiner

| Probability State | LPS Range | | | |
| --- | --- | --- | --- | --- |
| | Segment 0 | Segment 1 | Segment 2 | Segment 3 |
| ... | | | | |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| ... | | | | |

| Syntax element | binIdx | | | | | |
|---|---|---|---|---|---|---|
| | 0 | 1 | 2 | 3 | 4 | >= 5 |
| end_of_slice_one_bit | terminate | na | na | na | na | na |
| end_of_tile_one_bit | terminate | na | na | na | na | na |
| end_of_subset_one_bit | terminate | na | na | na | na | na |
| general_merge_flag[ ][ ] | 0 | na | na | na | na | na |
| regular_merge_flag[ ][ ] | cu_skip_flag[ ][ ] ? 0 : 1 | na | na | na | na | na |
| mmvd_merge_flag[ ][ ] | 0 | na | na | na | na | na |
| mmvd_cand_flag[ ][ ] | 0 | na | na | na | na | na |
| mmvd_distance_idx[ ][ ] | 0 | bypass | bypass | bypass | bypass | bypass |
| mmvd_direction_idx[ ][ ] | bypass | bypass | na | na | na | na |
| merge_subblock_flag[ ][ ] | 0,1,2 | na | na | na | na | na |
| merge_subblock_idx[ ][ ] | 0 | bypass | bypass | bypass | bypass | na |
| ciip_flag[ ][ ] | 0 | na | na | na | na | na |
| merge_idx[ ][ ] | 0 | bypass | bypass | bypass | bypass | na |
| merge_gpm_partition_idx[ ][ ] | bypass | bypass | bypass | bypass | bypass | bypass |
| merge_gpm_idx0[ ][ ] | 0 | bypass | bypass | bypass | bypass | na |
| merge_gpm_idx1[ ][ ] | 0 | bypass | bypass | bypass | na | na |
| inter_pred_idc[ x0 ][ y0 ] | ( cbWidth + cbHeight ) > 12 ? 7 − ( ( 1 + Log2( cbWidth ) + Log2( cbHeight ) ) >> 1 ) : 5 | 5 | na | na | na | na |
| inter_affine_flag[ ][ ] | 0,1,2 | na | na | na | na | na |
| cu_affine_type_flag[ ][ ] | 0 | na | na | na | na | na |
| ... | ... | | | | | |

FIG. 7

| Syntax element | condL | condA | ctxSetIdx |
|---|---|---|---|
| alf_ctb_flag[ cIdx ][ xCtb ][ yCtb ] | alf_ctb_flag[ cIdx ][ xCtbL ][ yCtbL ] | alf_ctb_flag[ cIdx ][ xCtbA ][ yCtbA ] | cIdx |
| alf_ctb_cc_cb_idc[ xCtb ][ yCtb ] | alf_ctb_cc_cb_idc[ xCtbL ][ yCtbL ] | alf_ctb_cc_cb_idc[ xCtbA ][ yCtbA ] | 0 |
| alf_ctb_cc_cr_idc[ xCtb ][ yCtb ] | alf_ctb_cc_cr_idc[ xCtbL ][ yCtbL ] | alf_ctb_cc_cr_idc[ xCtbA ][ yCtbA ] | 0 |
| split_qt_flag | CqtDepth[ chType ][ xNbL ][ yNbL ] > cqtDepth | CqtDepth[ chType ][ xNbA ][ yNbA ] > cqtDepth | cqtDepth >= 2 |
| split_cu_flag | CbHeight[ chType ][ xNbL ][ yNbL ] < cbHeight | CbWidth[ chType ][ xNbA ][ yNbA ] < cbWidth | ( allowSplitBtVer + allowSplitBtHor + allowSplitTtVer + allowSplitTtHor + 2 * allowSplitQt − 1 ) / 2 |
| non_inter_flag | CuPredMode[ chType ][ xNbL ][ yNbL ] == MODE_INTRA | CuPredMode[ chType ][ xNbA ][ yNbA ] == MODE_INTRA | 0 |
| cu_skip_flag[ x0 ][ y0 ] | CuSkipFlag[ xNbL ][ yNbL ] | CuSkipFlag[ xNbA ][ yNbA ] | 0 |
| pred_mode_flag[ x0 ][ y0 ] | CuPredMode[ chType ][ xNbL ][ yNbL ] == MODE_INTRA | CuPredMode[ chType ][ xNbA ][ yNbA ] == MODE_INTRA | 0 |
| pred_mode_ibc_flag[ x0 ][ y0 ] | CuPredMode[ chType ][ xNbL ][ yNbL ] == MODE_IBC | CuPredMode[ chType ][ xNbA ][ yNbA ] == MODE_IBC | 0 |
| intra_mip_flag | IntraMipFlag[ xNbL ][ yNbL ] | IntraMipFlag[ xNbA ][ yNbA ] | 0 |
| merge_subblock_flag[ x0 ][ y0 ] | MergeSubblockFlag[ xNbL ][ yNbL ] \|\| InterAffineFlag[ xNbL ][ yNbL ] | MergeSubblockFlag[ xNbA ][ yNbA ] \|\| InterAffineFlag[ xNbA ][ yNbA ] | 0 |
| inter_affine_flag [ x0 ][ y0 ] | MergeSubblockFlag[ xNbL ][ yNbL ] \|\| InterAffineFlag[ xNbL ][ yNbL ] | MergeSubblockFlag[ xNbA ][ yNbA ] \|\| InterAffineFlag[ xNbA ][ yNbA ] | 0 |

CONTEXT-BASED ADAPTIVE BINARY ARITHMETIC CODING (CABAC) CONTEXT MODELING WITH INFORMATION FROM TEMPORAL NEIGHBORS

INCORPORATION BY REFERENCE

The present application claims the benefit of priority to U.S. Provisional Application No. 63/452,379, "Context-Based Adaptive Binary Arithmetic Coding (CABAC) Context Modeling with Information from Spatial Neighbors" filed on Mar. 15, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding/decoding. In some examples, an apparatus for video decoding includes receiving circuitry and processing circuitry. The processing circuitry receives coded information of a current block in a current picture from a coded video bitstream. The coded information includes a syntax element associated with the current block, the syntax element indicates a decoding parameter of the current block. The processing circuitry determines a context-based adaptive binary arithmetic coding (CABAC) context model associated with the syntax element based on at least a temporally co-located block of the current block. The temporally co-located block is in a different picture from the current picture. Further, the processing circuitry decodes the syntax element based on the CABAC context model, and reconstructs the current block based on the syntax element that is decoded based on the CABAC context model.

According to an aspect of the disclosure, the temporally co-located block is located in a reference picture of the current picture at same coordinates as the current block. In some examples, the processing circuitry determines the CABAC context model based on one or more subblocks located at pre-defined positions relative to the temporally co-located block. For example, the processing circuitry determines the CABAC context model based on at least a first subblock at a middle position relative to the temporally co-located block and a second subblock at a bottom right position relative to the temporally co-located block.

In some examples, the processing circuitry determines the CABAC context model associated with the syntax element based on at least a spatially neighboring block and at least the temporally co-located block of the current block. In some embodiments, the processing circuitry scans at least the spatially neighboring block and at least the temporally co-located block to determine a number of blocks in at least the spatially neighboring block and at least the temporally co-located block that satisfy a requirement, and determines the CABAC context model based on the number of blocks that satisfy the requirement. In an example, the syntax element is a flag indicative of whether the current block is only intra coded or not, and the processing circuitry scans at least the spatially neighboring block and at least the temporally co-located block to determine a number of blocks in at least the spatially neighboring block and at least the temporally co-located block that are intra coded and determines the CABAC context model for deriving the flag based on the number of blocks.

It is noted that the syntax element can be one of an inter affine flag, a merge subblock flag, a local illumination compensation flag, a non-inter flag, a coding unit skip flag, a prediction mode flag, or an inter matrix-based intra-prediction (mip) flag.

Aspects of the disclosure also provide a non-transitory computer-readable medium storing instructions which, when executed by a computer cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 4 shows a table of quantized values of least probable symbol ranges in some examples.

FIG. 6 shows a table in some examples.

FIG. 7 shows another table in some examples.

DETAILED DESCRIPTION OF EMBODIMENTS

Figure 1:
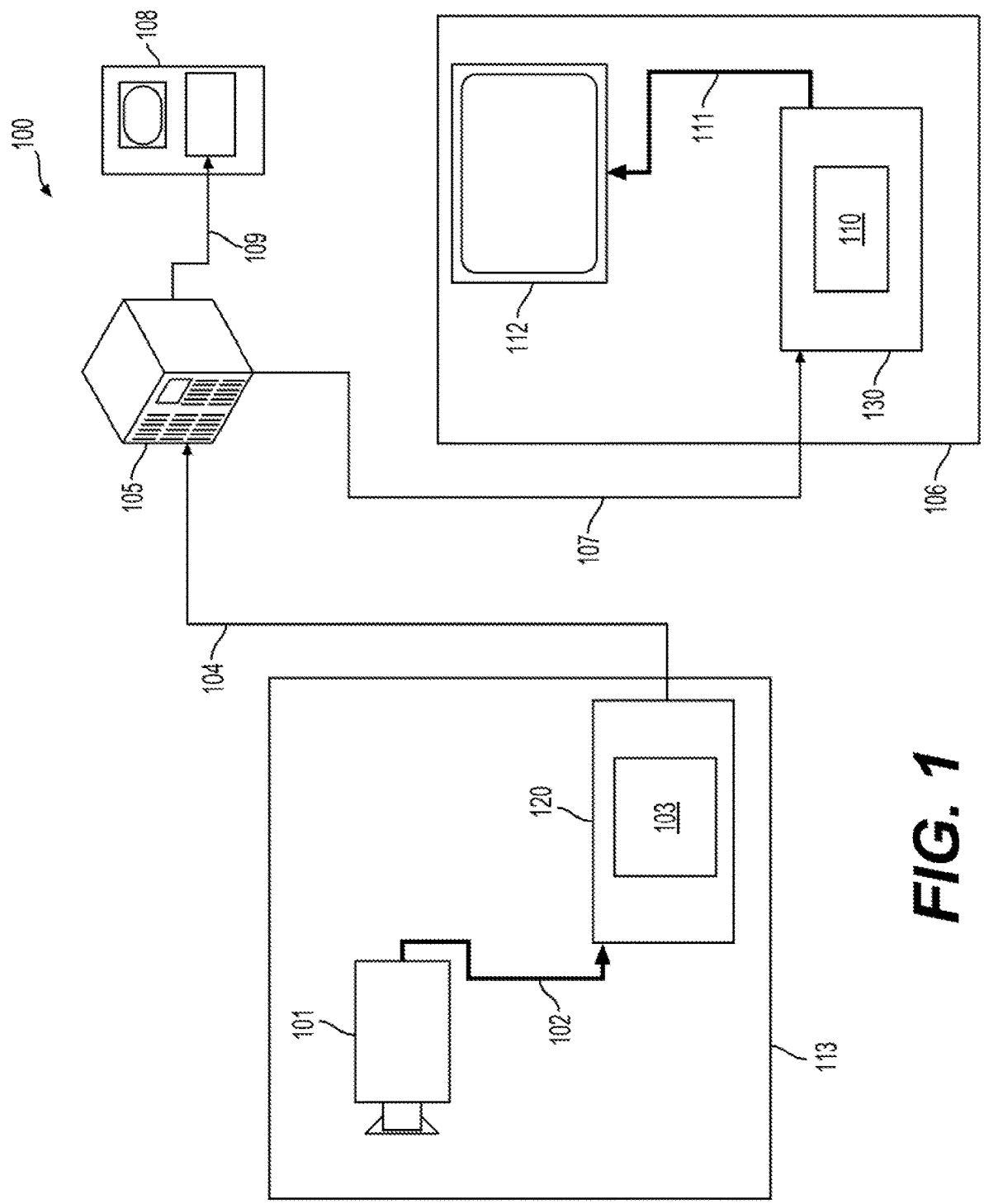
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
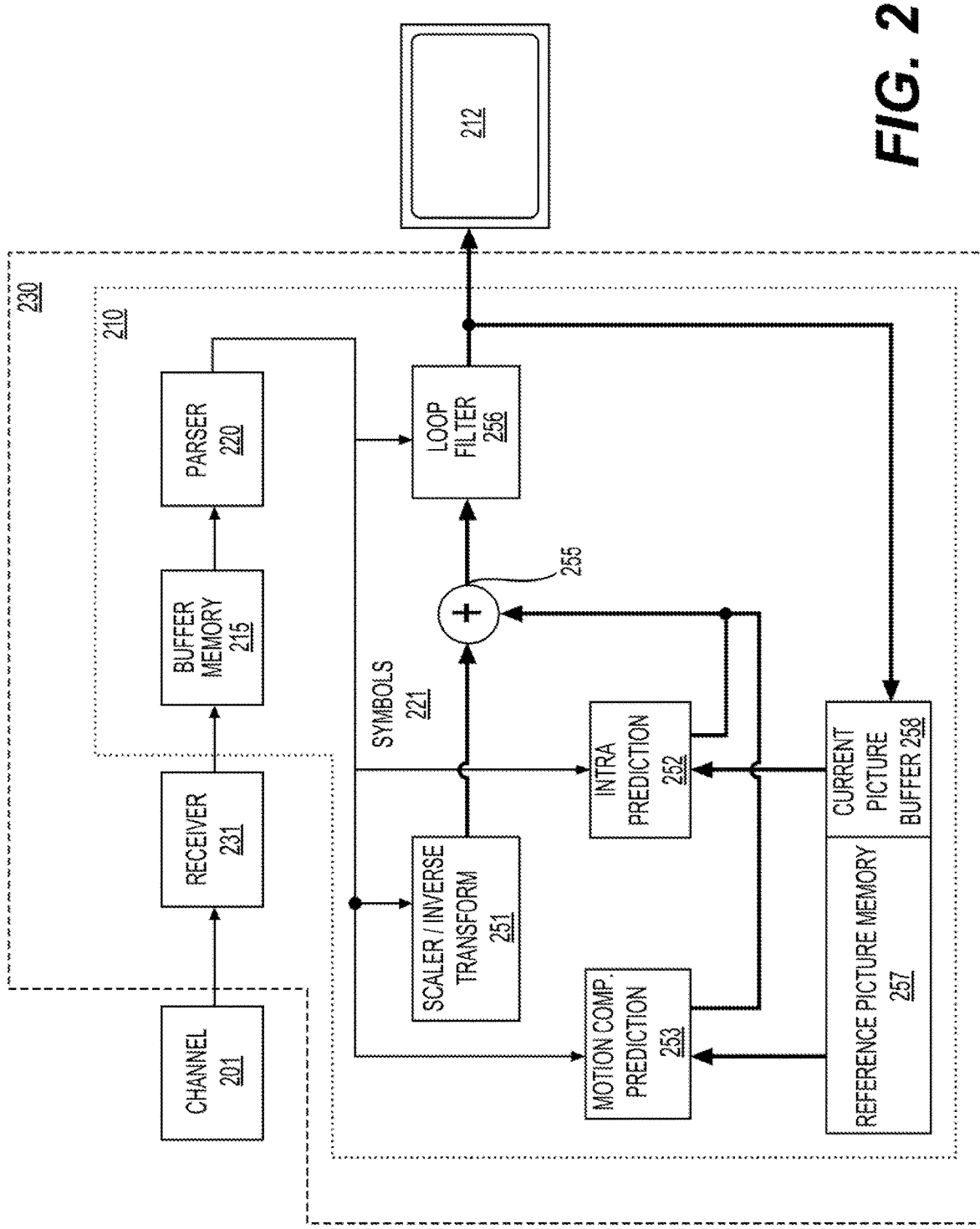
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
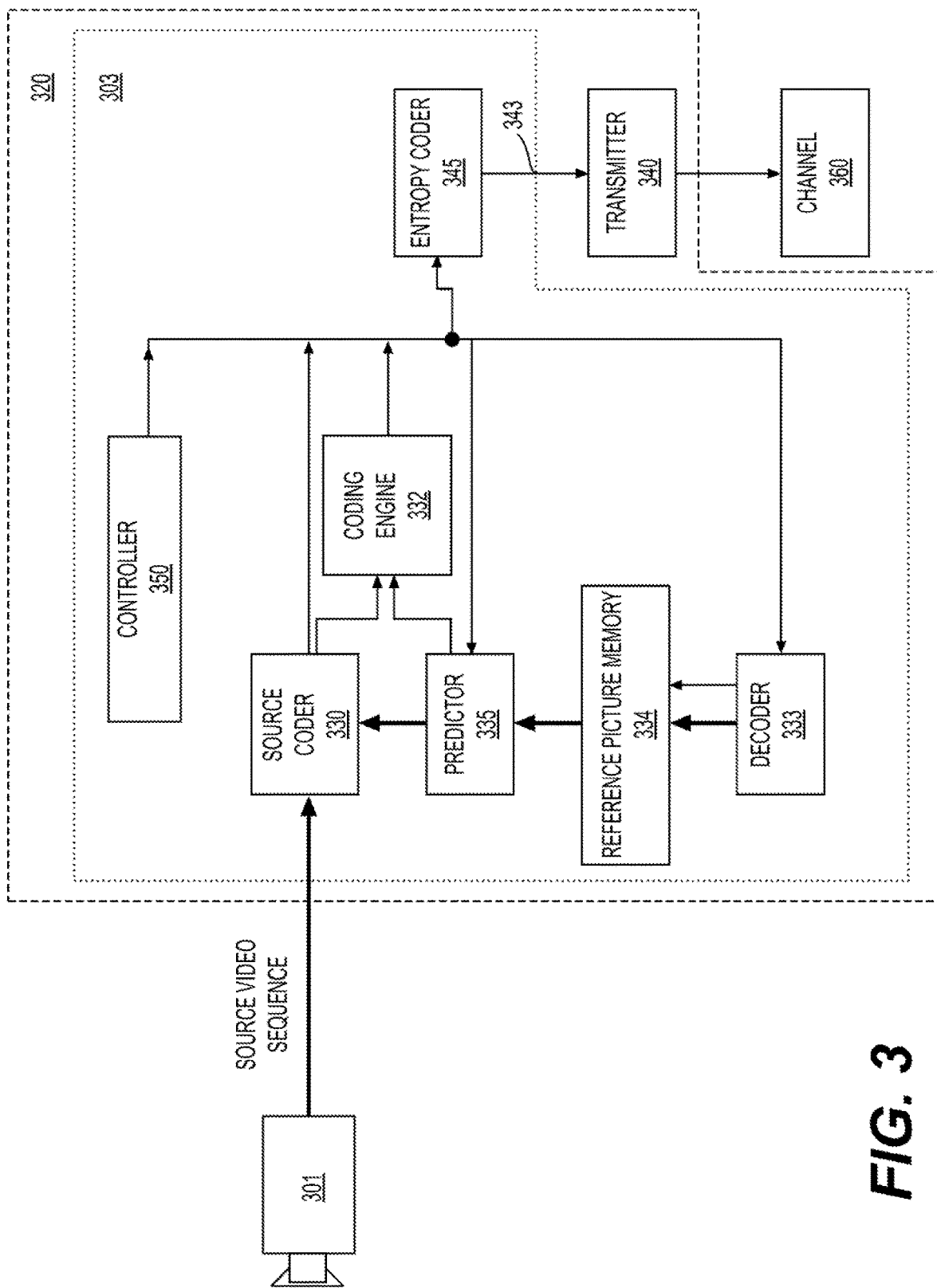
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Some aspects of the disclosure provide techniques for entropy coding, such as techniques for context-based adaptive binary arithmetic coding (CABAC). For example, context models in CABAC for coding a current block can be determined based on information from temporal neighboring blocks (also referred to as temporally co-located blocks) of the current block and/or spatial neighboring blocks of the current block. CABAC can be used for coding various syntax elements, such as an inter affine flag (e.g., inter_affine_flag), a subblock merge flag (e.g., merge_subblock_flag), a local illumination compensation (LIC) flag (e.g., lic_flag) and the like. An inter affine flag associated with a coding block is used to indicate whether the coding block is coded using affine motion compensated prediction. A subblock merge flag associated with a coding block is used to indicate whether the coding block is coded using a subblock motion compensation mode. An LIC flag associated with a coding block is used to indicate whether the coding block is coded using local illumination compensation.

CABAC is a coding technique used in entropy coding. Generally, the encoding process of CABAC includes a binarization step, a context modeling step and an arithmetic coding step.

In the binarization step for the CABAC based encoding process, a syntax element of nonbinary value can be mapped to a binary sequence, also referred to as a bin string. The binarization step can be bypassed when the syntax element is provided of a value in binary form (e.g., a binary sequence).

In the context modeling step for the CABAC based encoding process, a probability model is determined depending on previously encoded syntax elements. In some examples, a probability model (also referred to as context or context model in CABAC) can be represented by a probability state (also referred to as context state in some examples) and a most probable symbol (MPS) value. The probability state is associated with a probability value and can implicitly represent that the probability of a particular symbol (e.g., a bin) being the Least Probable Symbol (LPS) is equal to the probability value. A symbol can be an LPS or an MPS. For binary symbol, the MPS and the LPS can be 0 or 1. For example, if the LPS is 1, the MPS is 0; and if the LPS is 0, the MPS is 1. The probability value is estimated for the corresponding context and can be used to entropy code the symbol using the arithmetic coder.

The arithmetic coding step of the CABAC based encoding process is based on the principle of recursive interval subdivision according to the probability model. In some examples, the arithmetic coding step is handled by a state machine with a range parameter and a low parameter. The state machine can change values of the range parameter and the low parameter based on the contexts (probability models) and a sequence of bins to code. The value of the range parameter indicates a size of a current range that the coded value (of bins) falls into, and the value of the low parameter indicates the lower boundary of the current range. In an example, according to a probability state (e.g., in association with a probability value), a current range (CurrRange) is divided into a first subrange (MpsRange) (also referred to as MPS range of the current state) and a second subrange (LpsRange) (also referred to as LPS range of the current state). In an example, the second subrange can be calculated by a multiplication, such as using Eq. (1)

$$LpsRange = CurrRange \times \rho \qquad \text{Eq. (1)}$$

where $\rho$ is the probability value that the current bin is the LPS. The probability that the current bin is MPS can be calculated by $(1-\rho)$. The first subrange can be calculated by Eq. (2):

$$MpsRange = CurrRange - LpsRange \qquad \text{Eq. (2)}$$

In an example, when the current bin is MPS, the value of the low parameter is kept, and the value of the range parameter is updated to MpsRange; and when the current bin is LPS, the value of the low parameter is updated to (low+MpsRange), and the value of the range parameter is updated to LpsRange. Then, the encoding process of CABAC can continue to a next bin in the sequence of bins.

In some examples (e.g., HEVC), the value of the range parameter is expressed with 9 bits and the value of the low parameter is expressed with 10 bits. Further, a renormalization process can be performed to maintain the range and low values at sufficient precision. In some examples, the renormalization can be performed whenever the value of the range parameter is less than 256. Therefore, the range parameter is equal or larger than 256 after renormalization.

In some examples (e.g., HEVC), 64 possible probability values for the LPS can be used and each MPS can be 0 or 1. In an example, the probability models can be stored as 7-bit entries that correspond to 64 probability values (64 probability states) and 2 possible values for MPS (0 or 1). In each of the 7-bit entries, 6 bits may be allocated for representing the probability state, and 1 bit may be allocated for the MPS.

In some examples, to reduce the computation of deriving LPS ranges (e.g., multiplications in Eq. (1)), results for all cases are pre-calculated, quantized and stored as approximations in a look-up table. Therefore, the LPS range can be obtained by using a table lookup without any multiplication operations. Avoiding multiplication can be important for some devices or applications, to reduce computation and latency.

FIG. 4 shows a table (400) of quantized values of LPS ranges in some examples. In some examples, the range parameter is expressed with 9 bits, and the values of the range parameter are equal or greater than 256. The ranges can be divided into four segments, such as referred to as segment 0, segment 1, segment 2 and segment 3. The segment 0 includes 64 ranges with values from 256 to 319; the segment 1 includes 64 ranges with values from 320 to 383; the segment 2 includes 64 ranges with values from 384 to 447; the segment 3 includes 64 ranges with values from 448 to 511. The index of the segments can be derived using (range>>6)&3 in an example, where range denotes to the range parameter expressed with 9 bits. In some examples, the range parameter is expressed with 9 bits, then the quantized values of the LPS range can be expressed using 8 bits, thus values in the table (400) can be expressed using 8 bits.

In the FIG. 4 example, the table (400) includes 4 columns respectively corresponding the 4 segments of ranges and includes 64 rows respectively corresponding to 64 probability states (associated with respective probability values). A value stored at an entry with a row index and a column index is a quantized value for a LPS range in association with a probability state (corresponding to the row index) and a range segment (corresponding to the column index). In the FIG. 4 example, LPS ranges for a probability state are quantized into four values (i.e., one value for each segment).

In some examples, a CABAC engine for performing CABAC based encoding or decoding (e.g., in a video encoder or in a video decoder), can include the table (400) that stores 64×4 8-bit values to approximate the calculations in Eq. (1). The table (400) can be used for performing a table-based probability transition process between 64 different probability states. For example, for a current range, a probability state is determined. The current range is used to determine a range segment that indicates a column index in the table (400). The probability state is used to determine a row index in the table (400). Then, a table lookup is performed to the table (400) to obtain a value stored in an entry having the row index and the column index, and the value is the approximated LPS range.

In some examples (e.g., VVC), the probability value of a probability state is linearly expressed by a probability index (denoted by pStateIdx), and calculation can be done with equations without LUT operation. To improve the accuracy of probability estimation, a multi-hypothesis probability update model can be applied. For example, the pStateIdx used in the interval subdivision in the binary arithmetic coder is a combination of two probabilities pStateIdx0 and pStateIdx1 (in the case of two hypotheses). The two probabilities are associated with respective context models and are updated independently with different adaptation rates. The adaptation rates of pStateIdx0 and pStateIdx1 for the respective context models can be pre-trained based on the statistics of the associated bins. In some examples, the probability estimate pStateIdx is an average of the estimates from the two hypotheses.

Figure 5:
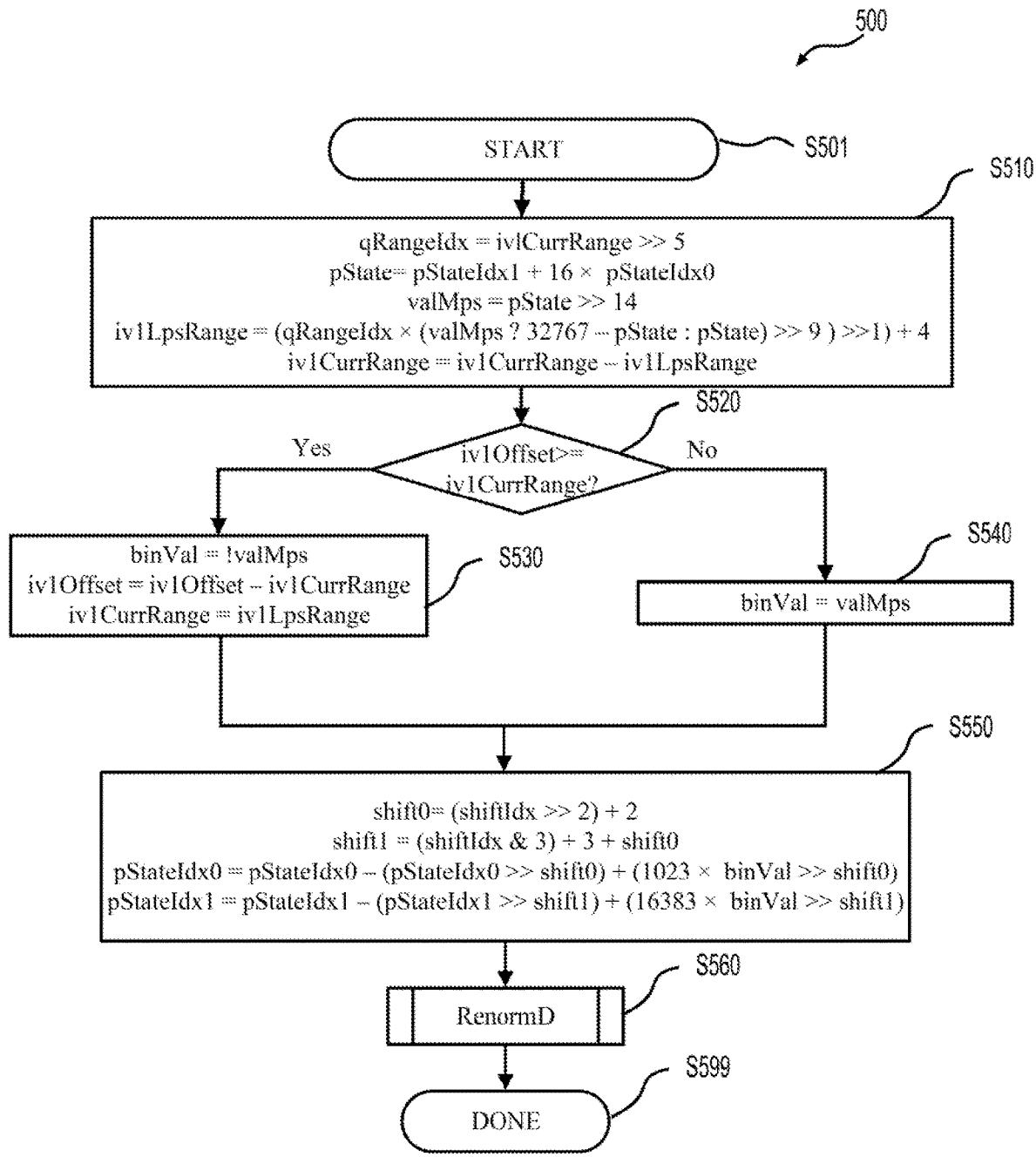
FIG. 5 shows a flowchart outlining a process for decoding a single binary decision in some examples.

FIG. 5 shows a flowchart outlining a process (500) for decoding a single binary decision in some examples (e.g., VVC). In some examples, context table (e.g., denoted by a variable ctxTable), and context index (e.g., denoted by ctxIdx), can be provided to the process (500) to obtain the probability state information, such as two probabilities pStateIdx0 and pStateIdx1. The process (500) can operate on variables ivlCurrRange (indicative of the current range), and iv/Offset (indicative of the lower boundary of the current range) based on the probability state information, such as the two probabilities pStateIdx0 and pStateIdx1, and can output the decoded value binVal, and update the variables iv/Curr-Range and ivlOffset, and the two probabilities pStateIdx0 and pStateIdx1. It is noted that, in some examples, the variables ivlCurrRange and ivlOffset are defined in certain way that ivlOffset is greater than or equal to ivlCurrRange. The process (500) starts at (S501), and proceeds to (S510).

At (S510), the value of the LPS range (denoted by a variable ivlLpsRange) is derived. In an example, given the current value of ivlCurrRange, a variable qRangeIdx is derived as Eq. (3):

$$qRangeIdx = ivlCurrRange >> 5 \quad \text{Eq. (3)}$$

Then, given qRangeIdx, pStateIdx0 and pStateIdx1 (associated with ctxTable and ctxIdx), the value of MPS (denoted by valMps) and the value of LPS range (denoted by ivlLpsRange) are derived, for example according to Eq. (4), Eq. (5) and Eq. (6):

$$pState = pStateIdx1 + 16 \times pStateIdx0 \quad \text{Eq. (4)}$$

$$valMps = pState >> 14 \quad \text{Eq. (5)}$$

$$ivlLpsRange = \quad \text{Eq. (6)}$$
$$(qRangeIdx \times ((valMps?32767 - pState : pState) >> 9) >> 1) + 4$$

Further, the bin is assumed to be MPS, then the variable ivlCurrRange is set equal to (ivlCurrRange–ivlLpsRange).

At (S520), if the variable ivlOffset is greater than or equal to iv/CurrRange, the assumption (the bin is MPS) is not true, and the process proceeds to (S530); otherwise, the process proceeds to (S540).

At (S530), the bin is LPS and thus the bin value (denoted by the variable binVal) is set equal to (1−valMps), the lower boundary of the current range and the current range are updated accordingly. In an example, the variable ivlOffset is decremented by ivlCurrRange, and ivlCurrRange is set equal to ivlLpsRange.

At (S540), the bin is MPS, and the variable binVal is set equal to valMps.

At (S550), state transition is performed. The probability state information, such as the two probabilities pStateIdx0 and pStateIdx1, is updated based on the decoded value binVal.

In some examples, two adaptation variables shift0 and shift1 are derived from the shiftIdx value that is associated with ctx Table and ctxIdx, such as shown by Eq. (7) and Eq. (8):

$$shift0 = (shiftIdx >> 2) + 2 \quad \text{Eq. (7)}$$

$$shift1 = (shiftIdx \& 3) + 3 + shift0 \quad \text{Eq. (8)}$$

The probability state information, such as the two probabilities pStateIdx0 and pStateIdx1, is updated according to the decoded value binVal, such as shown by Eq. (9) and Eq. (10):

$$pStateIdx0 = \quad \text{Eq.(9)}$$
$$pStateIdx0 - (pStateIdx0 >> shift0) + 1023 \times binVal >> shift0)$$

$$pStateIdx1 = \quad \text{Eq. (10)}$$
$$pStateIdx1 - (pStateIdx1 >> shift1) + 16383 \times binVal >> shift1)$$

At (S560), a renormalization step can be performed, for example, when the current range iv/CurrRange is less than 256. Then, the process (500) proceeds to (S599) and terminates.

It is noted that the probability state can be initialized at the beginning of each slice. In some examples (e.g., HEVC and VVC), CABAC engine can have a QP dependent initialization process invoked at the beginning of each slice. In an example, given the initial value of luma QP for a slice, the initial probability state of a context model, denoted as preCtxState, is derived according to Eq. (11)-Eq. (15):

$$slopeIdx = initValue >> 3 \quad \text{Eq. (11)}$$

$$offsetIdx = initValue \& 7 \quad \text{Eq. (12)}$$

$$m = slopeIdx \times 5 - 45 \quad \text{Eq. (13)}$$

$$n = (offsetIdx << 3) + 7 \quad \text{Eq. (14)}$$

$$preCtxState = \quad \text{Eq. (15)}$$
$$Clip3(1, 127, ((m \times (Clip3(0, 63, SliceQp_Y) - 16)) >> 1) + n$$

where the variable initValue is a 6-bit variable that is obtained from tables associated with the variables ctxTable and ctxIdx, $SliceQ_{pY}$ denotes the slice QP value, slopeIdx and offsetIdx are restricted to 3 bits. The probability state preCtxState represents the probability in the linear domain directly. It is noted that Clip3(x, y, z) is a function that clips z in the range of [x, y].

It is noted that, in some examples, proper shifting operations can be performed on preCtxState to generate inputs to arithmetic coding engine (for performing arithmetic coding step). In some examples, mapping from logarithmic to linear domain as well as the table (400) is not needed. In some examples, the two probabilities pStateIdx0 and pStateIdx1 can be derived from the initialization using shifting operations, such as according to Eq. (16) and Eq. (17):

$$pStateIdx0 = preCtxState << 3 \quad \text{Eq. (16)}$$

$$pStateIdx1 = preCtxState << 7 \quad \text{Eq. (17)}$$

In some examples, for a decoding process of the CABAC, inputs to the decoding process can be all bin strings of a syntax element. The bin strings of the syntax element can be obtained based on a binarization process. Output of the decoding process can be a value of the syntax element. The decoding process can specify how each bin of a bin string is parsed for each syntax element. After parsing each bin, a resulting bin string (or a parsed bin string) can be compared to all bin strings of the syntax element that are obtained based on the binarization process. A result of the comparison can be determined as follows: (1) If the parsed bin string (or resulting bin string) is equal to one of the bin strings, the corresponding value of the syntax element is the output. (2) Otherwise (e.g., the parsed bin string is not equal to one of the bin strings), a next bit is parsed. When each bin is parsed, the variable binIdx is incremented by 1 starting with binIdx being set equal to 0 for the first bin. The parsing of each bin is specified by two ordered steps: (1) The derivation process for ctxTable, ctxIdx, and bypassFlag can be invoked with binIdx as an input and ctx Table, ctxIdx and bypassFlag as outputs. (2) The arithmetic decoding process can be invoked with ctxTable, ctxIdx and bypassFlag as inputs and the value of the bin as output.

In a derivation process for ctxTable, ctxIdx, and bypass-Flag, an input to the derivation process can be a position of a current bin within a bin string. The position of the current bin in the bin string can be denoted as a bin index (e.g., binIdx). Outputs of the derivation process can be ctxTable, ctxIdx, and bypassFlag. The values of ctx Table, ctxIdx and bypassFlag can be derived based on entries (or values) of binIdx of corresponding syntax elements in a table, such as a table (600) in FIG. 6.

FIG. 6 shows the table (600) for assignment of ctxInc to syntax elements with context coded bins.

If an entry in the table (600) is not equal to "bypass", "terminate" or "na", the values of binIdx can be decoded by invoking a DecodeDecision process. As shown in table (600), the variable ctxInc can be specified by a corresponding entry in table (600). When more than one values are listed in table (600) for a binIdx, the assignment process for ctxInc for the corresponding binIdx can further be specified by a derivation process of ctxInc. The variable ctxIdxOffset can be set equal to a smallest value of ctxIdx for a current value of initType and a current syntax element. ctxIdx can be set equal to a sum of ctxInc and ctxIdxOffset. A bypassFlag can be set equal to 0.

If the entry in table (600) is equal to "bypass", the values of binIdx can be decoded by invoking the DecodeBypass process. Accordingly, ctxTable can be set equal to 0. ctxIdx can be set equal to 0. bypassFlag can be set equal to 1.

If the entry in table (600) is equal to "terminate", the values of binIdx can be decoded by invoking the Decode-Terminate process. Accordingly, ctx Table can be set equal to 0. ctxIdx can be set equal to 0. bypassFlag can be set equal to 0.

If the entry in table (600) is equal to "na", the values of binIdx do not occur for the corresponding syntax element.

In some examples, the derivation process of ctxInc can use left and above syntax elements. Inputs to the derivation process of ctxInc can be a luma location (x0, y0) specifying a top-left luma sample of a current luma block relative to a top-left sample of a current picture, a color component cIdx, a current coding quadtree depth cqtDepth, a dual tree channel type chType, a width and a height of the current coding block in luma samples cbWidth and cbHeight, and variables that are derived in coding tree semantics. The variables can include allowSplitBtVer, allowSplitBtHor, allowSplitTtVer, allowSplitTtHor, and allowSplitQt. An output of the derivation process of ctxInc can be a context index ctxInc.

In some examples, a left location (xNbL, yNbL) can be set equal to (x0-1, y0) and the derivation process for neighboring block availability can be invoked based on a location (xCurr, yCurr) being set equal to (x0, y0), a neighboring location (xNbY, yNbY) being set equal to (xNbL, yNbL), checkPredModeY being set equal to FALSE, and cIdx being set as inputs. An output of the derivation process for neighboring block availability can be assigned to a variable availableL.

In some embodiments, an above location (xNbA, yNbA) can be set equal to (x0, y0-1) and the derivation process for neighboring block availability can be invoked based on the location (xCurr, yCurr) being set equal to (x0, y0), the neighboring location (xNbY, yNbY) being set equal to (xNbA, yNbA), the checkPredModeY being set equal to FALSE, and the cIdx being set as inputs. An output of the derivation process for neighboring block availability can be assigned to a variable availableA.

In an example, the location (xCtb, yCtb) (e.g., CTB of current block) can be set equal to (x0>>CtbLog2SizeY, y0>>CtbLog2SizeY), the location (xCtbA, yCtbA) (e.g., CTB of above neighboring block) can be set equal to (xNbA>>CtbLog2SizeY, yNbA>>CtbLog2SizeY), and the location (xCtbL, yCtbL) (e.g., CTB of left neighboring block) can be set equal to (xNbL>>CtbLog2SizeY, yNbL>>CtbLog2SizeY). Then ctxInc can be determined based on the above and the left neighboring blocks.

FIG. 7 shows a table (700) for shows a specification of ctxInc using left and above syntax elements. The assignment of ctxInc can be specified as follows with condL and condA specified in table (700).

In some exmaples, for syntax elements alf_ctb_flag[cldx] [xCtb][yCtb], alf_ctb_cc_cb_idc[xCtb][yCtb], alf_ctb_cc_cr_idc[xCtb][yCtb], split_qt_flag, split_cu_flag, cu_skip_flag[x0][y0], pred_mode_ibc_flag[x0][y0], intra_mip_flag, inter_affine_flag[x0][y0], and merge_subblock_flag[x0] [y0], ctxInc can be determined as follows in Eq. (18):

$$\text{ctxInc}=(\text{cond}L\ \&\&\ \text{available}L)+(\text{cond}A\ \&\&\ \text{available}A)+\text{ctxSetIdx}\times 3 \quad \text{Eq. (18)}$$

In some examples, for syntax elements pred_mode_flag [x0][y0] and non_inter_flag, ctxInc can be determined as follows in Eq. (19):

$$ctxInc = (condL\ \&\&\ availableL) || (condA\ \&\&\ availableA) \quad \text{Eq. (19)}$$

In a related example, using information from only above and left neighboring blocks of a current block to derive a CABAC context model, such as for inter_affine_flag or merge_subblock_flag, for the current block may be inefficient.

According to an aspect of the disclosure, context models for some syntax elements of a current block can depend on information of more than two spatially neighboring blocks of the current block and/or temporally neighboring blocks (also referred to as co-located blocks) of the current block. The syntax elements can include an inter affine flag (e.g., inter_affine_flag) and/or a subblock merge flag (e.g., merge_subblock_flag), and/or a LIC flag (e.g., lic_flag). It is noted that the syntax elements can include other suitable syntax element in table (700).

For simplicity and clarity, some embodiments of the current disclosure can be provided based on a specific syntax element, such as inter_affine_flag as an exemplary syntax element.

In some examples, one or more additional context increments (e.g., ctxInc) can be used for determining a syntax element of a current block. The ctxInc can indicate a context index (e.g., ctxIdx) of a context model. For example, ctxIdx can be set equal to a sum of ctxInc and ctxIdxOffset. ctxIdxOffset can be a fixed value, which depends on the type of syntax element and the types of slices (I, B and P). The context increment (e.g., ctxInc) can be computed using information such as the size of the current block, the type of current block, and information of neighboring blocks of the current block. Accordingly, the context model of the syntax element can be derived depending on the information of M spatially neighboring blocks of the current block, where M can be a positive integer.

Figure 8:
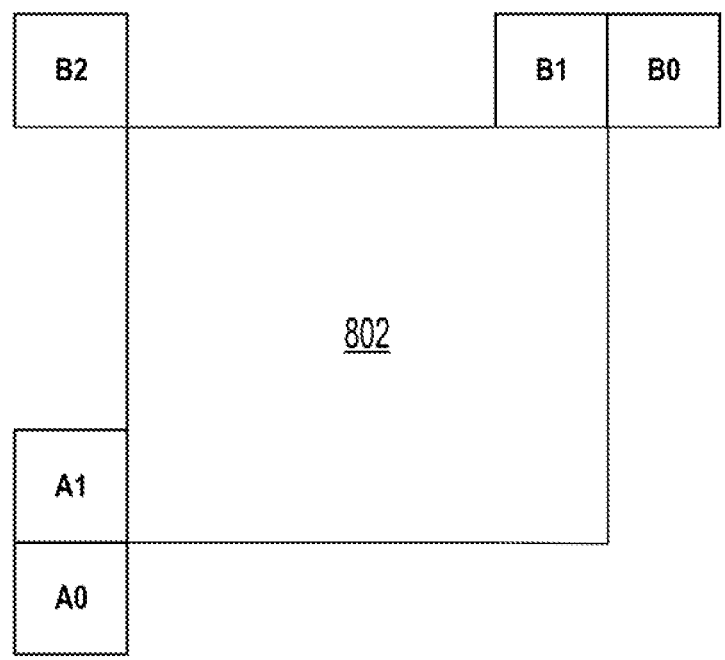
FIG. 8 shows a diagram of positions of spatial neighbors in some examples.

In an embodiment, M can be equal to 5. The 5 spatial neighbors of the current block can be as shown in FIG. 8. As shown in FIG. 8, a current block (802) can include an above-right (B0) neighboring block, an above (B1) neighboring block, an above-left (B2) neighboring block, a left (A1) neighboring block, and a left-below (A0) neighboring block. Each of the neighboring blocks can have various sizes. For example, each neighboring block in FIG. 8 can include 4×4 luma samples.

Figure 9:
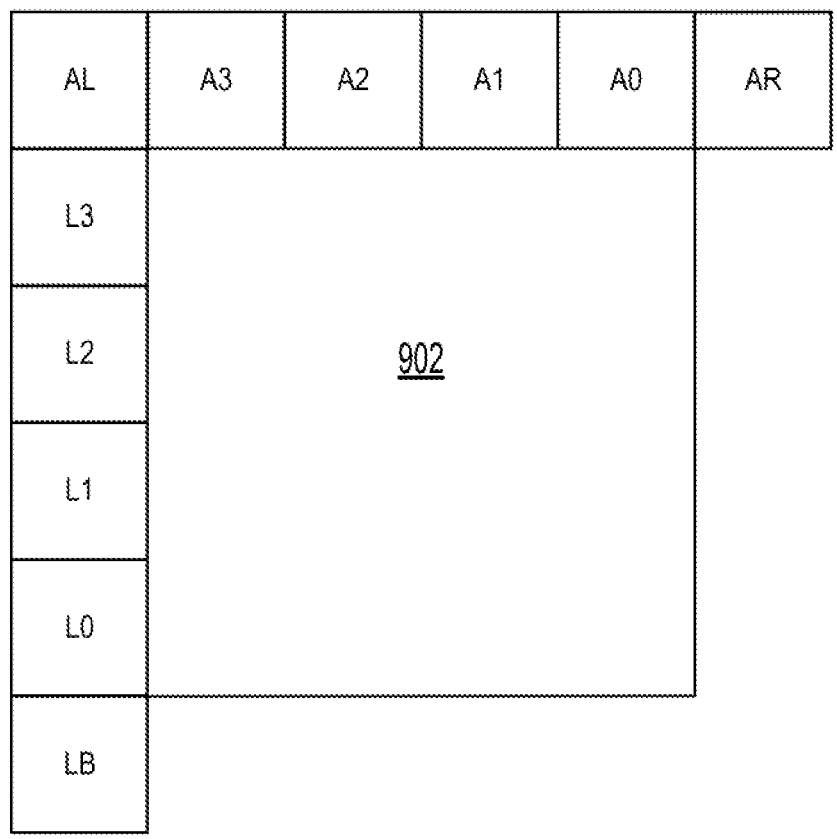
FIG. 9 shows a diagram of positions of spatial neighbors in some examples.

In an embodiment, M can be equal to a number of all sub-blocks from a left-below (LB) position to an above-left (AL) position, and from an above-left (AL) position to an above-right (AR) position, which can be shown in FIG. 9. As shown in FIG. 9, a current block (902) can include a column of neighboring blocks (e.g., LB, L0, L1, L2, L3, AL) adjacent to a left side of the current block (902) and a row of neighboring blocks (AL, A3, A2, A1, A0, and AR) adjacent to a top side of the current block (902). Each of the neighboring blocks can have various sizes. For example, each neighboring block in FIG. 9 can include 4×4 luma samples.

In an embodiment, the additional ctxInc for inter_affine_flag can be as shown in Table A. As shown in Table A, four values (e.g., 0, 1, 2, and 3) of the ctxInc can be provided to a first context coded bin (e.g., binIdx-0) of inter_affine_flag.

TABLE A

Assignment of ctxInc to syntax elements with context coded bins

| Syntax element | binIdx | | | | |
|---|---|---|---|---|---|
| | 0 | 1 | 2 | 3 | 4 | >=5 |
| inter_affine_flag[ ][ ] | 0, 1, 2, 3 | na | na | na | na | na |

In another embodiment, the additional ctxInc for merge_subblock_flag can be as shown in Table B. As shown in Table B, four values (e.g., 0, 1, 2, and 3) of the ctxInc can be provided to a first context coded bin (e.g., binIdx=0) of merge_subblock_flag.

TABLE B

Assignment of ctxInc to syntax elements with context coded bins

| Syntax element | binIdx | | | | |
|---|---|---|---|---|---|
| | 0 | 1 | 2 | 3 | 4 | >=5 |
| merge_subblock_flag[ ][ ] | 0, 1, 2, 3 | na | na | na | na | na |

In an embodiment, the ctxInc for inter_affine_flag can be set as 3 based on a combination of following two conditions: (1) N or more of the 5 (e.g., A0, A1, B0, B1, and B2 in FIG. 8) spatial neighbors are available (e.g., determined by a derivation process for neighboring block availability, such in subclause 6.4.4 in VVC spec document). In an example, N is equal to 4. (2) for each of the available spatial neighbors, a condition based on a merge subblock flag (e.g., MergeSubblockFlag) and an inter affine flag (InterAffineFlag) is false, such as in Eq. (20)

(MergeSubblockFlag[$xNb$][$yNb$]||Inter AffineFlag[$xNb$][$yNb$]) Eq. (20)

Otherwise, if at least one of the two conditions is not met, the value of the ctxInc of inter_affine_flag can be derived according to conditions of the left and above neighbours, condL and condA respectively. The condL and condA can be determined based on the table (700). The ctxInc can be determined as 0, 1, or 2, for example based on Eq. (18) with the value of the ctxSetIdx being 0.

For example, as shown in table (700), for inter_affine_flag, condL corresponds to MergeSubblockFlag[xNbL][yNbL]||Inter AffineFlag[xNbL][yNbL], and condA corresponds to MergeSubblockFlag[xNbA][yNbA]||Inter AffineFlag[xNbA][yNbA]. In an example, when (condL && available L) is met and (condA && avaialbeA) is not met, ctxInc can be determined as 0. In an example, when (condL && available L) is not met and (condA && avaialbeA) is met, ctxInc can be determined as 1. In an example, when both (condL && available L) and (condA && avaialbeA) are met, ctxInc can be determined as 2.

In an embodiment, the ctxInc for merge_subblock_flag can be set as 3 based on a combination of following two conditions: (1) N or more of the 5 (e.g., A0, A1, B0, B1, and B2 in FIG. 8) spatial neighbours are available (e.g., determined by a derivation process for neighbouring block availability, such in subclause 6.4.4 in VVC spec document). In an example, N is equal to 4. (2) for each of the available spatial neighbors, the condition in Eq. (20) is false.

Otherwise, if at least one of the two conditions is not met, the value of ctxInc of merge_subblock_flag can be derived according to conditions of the left and above neighbors, condL and condA respectively. The condL and condA can be determined based on the table (700). The ctxInc can be determined as 0, 1, or 2, based on for example Eq. (18) with the value of the ctxSetIdx being 0.

In an embodiment, the context model for a LIC flag (e.g., lic_flag) of a current block can be derived based on more than two neighbouring blocks of the current block. The LIC flag can indicate that LIC is applied to the current block if lic_flag has a value of true. Otherwise, LIC is not applied for the current block if lic_flag has a value of false.

Table C shows that four values of the ctxInc can be provided to a first context coded bin (e.g., binIdx=0) of lic_flag. Table D shows a conditional of a left neighboring block and a condition of an above neighboring block of a current block.

TABLE C

Assignment of ctxInc to syntax elements with context coded bins

| Syntax element | binIdx | | | | |
|---|---|---|---|---|---|
| | 0 | 1 | 2 | 3 | 4 | >=5 |
| lic_flag[ ][ ] | 0, 1, 2, 3 | na | na | na | na | na |

TABLE D

Specification of ctxInc using left and above syntax elements

| Syntax element | condL | condA | ctxSetIdx |
|---|---|---|---|
| lic_flag [ x0 ][ y0 ] | LicFlag[ xNbL ][ yNbL ] | LicFlag[ xNbA ][ yNbA ] | 0 |

In an example, the ctxInc for lic_flag can be set as 3 based on a combination of following two conditions: (1) N or more of the 5 (e.g., A0, A1, B0, B1, and B2 in FIG. 8) spatial neighbors are available. In an example, N is equal to 4. (2) a LIC flag for each of the available spatial neighbors is false. Otherwise, if at least one of the two conditions is not met, the ctxInc of lic_flag can be derived according to conditions of the left and above neighbors, condL and condA respectively. The condL and condA can be determined based on the Table D. The ctxInc can be determined as 0, 1, or 2, for example, according to Eq. (18) with the value of the ctxSetIdx being 0.

In an embodiment, the similar context modelling method can be applied for other syntax elements which are currently having ctxInc derived using left and above syntax elements, such as for non_inter_flag, cu_skip_flag, pred_mode_flag, intra_mip_flag, etc. Thus, context models for non_inter_flag, cu_skip_flag, pred_mode_flag, intra_mip_flag can be derived based on more than two neighboring blocks.

According to some aspects of the disclosure, the context model of a syntax element can be derived from one or more temporally co-located blocks of a current block. In some embodiments, the context model of a syntax element can be derived depending on the information of spatially neighboring blocks and N temporally co-located blocks of the current block. Example values of N include but not limited to 1, 2, 3, 4, . . . .

In an embodiment, the N temporally co-located blocks refer to N subblocks located at N pre-defined relative positions of a co-located block in a reference picture with the same coordinate of the current block.

Figure 10:
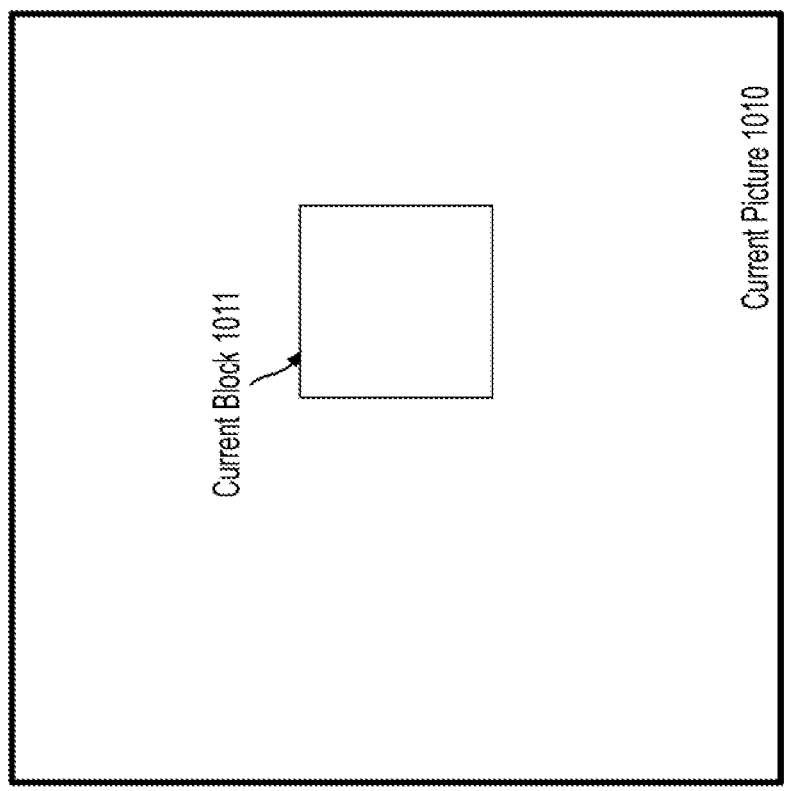
FIG. 10 shows a diagram of a temporally co-located block in some examples.

FIG. 10 shows a diagram of a current picture (1010) and a reference picture (1020) in some examples. The current picture (1010) includes a current block (1011) under coding. In the reference picture, a co-located block (1021) can be located with the same coordinates as the current block (1011). Based on the co-located block (1021), N subblocks with pre-defined relative positions of the co-located block (1021) can be determined. For example, N equals to 2, and the two pre-defined relative positions include the middle position shown by a subblock C0 and bottom right position shown by a subblock C1. Then, the N subblocks (also referred to as temporally neighboring blocks, temporally co-located blocks), such as the subblock C0 and the subblock C1, can be used to derive context model. It is noted that the temporally co-located blocks can be used with or without the spatial neighboring blocks to derive context model.

In some examples, both M spatially neighboring blocks and N temporally neighboring blocks are scanned, and the context model is derived by the number of blocks associated with a specific value of a syntax element. For example, when coding the flag indicating whether the current block is only intra coded or not (e.g., pred_mode_flag), the context model is derived based on how many spatially and temporally neighboring blocks are intra coded.

Figure 11:
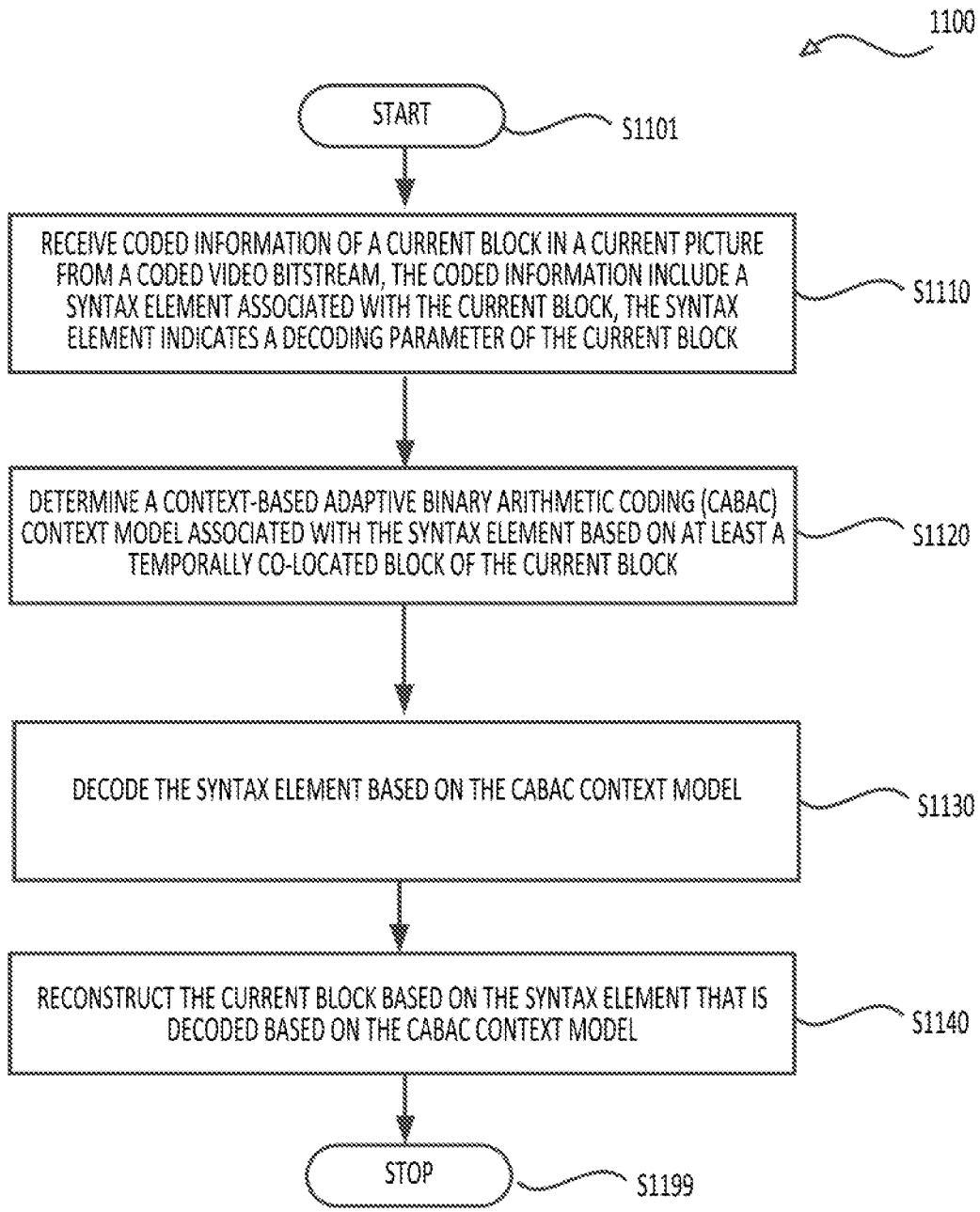
FIG. 11 shows a flow chart outlining a decoding process according to some embodiments of the disclosure.

FIG. 11 shows a flow chart outlining a process (1100) according to an embodiment of the disclosure. The process (1100) can be used in a video decoder. In various embodiments, the process (1100) is executed by processing circuitry, such as the processing circuitry that performs functions of the video decoder (110), the processing circuitry that performs functions of the video decoder (210), and the like. In some embodiments, the process (1100) is implemented in software instructions, thus when the processing circuitry executes the software instructions, the processing circuitry performs the process (1100). The process starts at (S1101) and proceeds to (S1110).

At (S1110), coded information of a current block in a current picture is received from a coded video bitstream. The coded information includes a syntax element associated with the current block, the syntax element indicates a decoding parameter of the current block.

At (S1120), a context-based adaptive binary arithmetic coding (CABAC) context model associated with the syntax element is determined based on at least a temporally co-located block of the current block.

At (S1130), the syntax element is decoded based on the CABAC context model.

At (S1140), the current block is reconstructed based on the syntax element that is decoded based on the CABAC context model.

In some examples, the temporally co-located block is located in a reference picture of the current picture at same coordinates as the current block.

In some examples, the CABAC context model is determined based on one or more subblocks located at pre-defined positions relative to the temporally co-located block. In an example, the CABAC context model is determined based on at least a first subblock at a middle position relative to the temporally co-located block and a second subblock at a bottom right position relative to the temporally co-located block.

In some examples, the CABAC context model associated with the syntax element is determined based on at least a spatially neighboring block and at least the temporally co-located block of the current block. For example, at least the spatially neighboring block and at least the temporally co-located block are scanned to determine a number of blocks in at least the spatially neighboring block and at least the temporally co-located block that satisfy a requirement. Then, the CABAC context model is determined based on the number of blocks that satisfy the requirement. In an example, the syntax element is a flag indicative of whether the current block is only intra coded or not. Then, at least the spatially neighboring block and at least the temporally co-located block to determine a number of blocks in at least the spatially neighboring block and at least the temporally co-located block that are intra coded, and the CABAC context model for deriving the flag is determined based on the number of blocks.

It is noted that the syntax element can be one of an inter affine flag, a merge subblock flag, a local illumination compensation flag, a non-inter flag, a coding unit skip flag, a prediction mode flag, or an inter matrix-based intra-prediction (mip) flag.

Then, the process proceeds to (S1199) and terminates.

The process (1100) can be suitably adapted. Step(s) in the process (1200) can be modified and/or omitted. Additional step(s) can be added. Any suitable order of implementation can be used.

Figure 12:
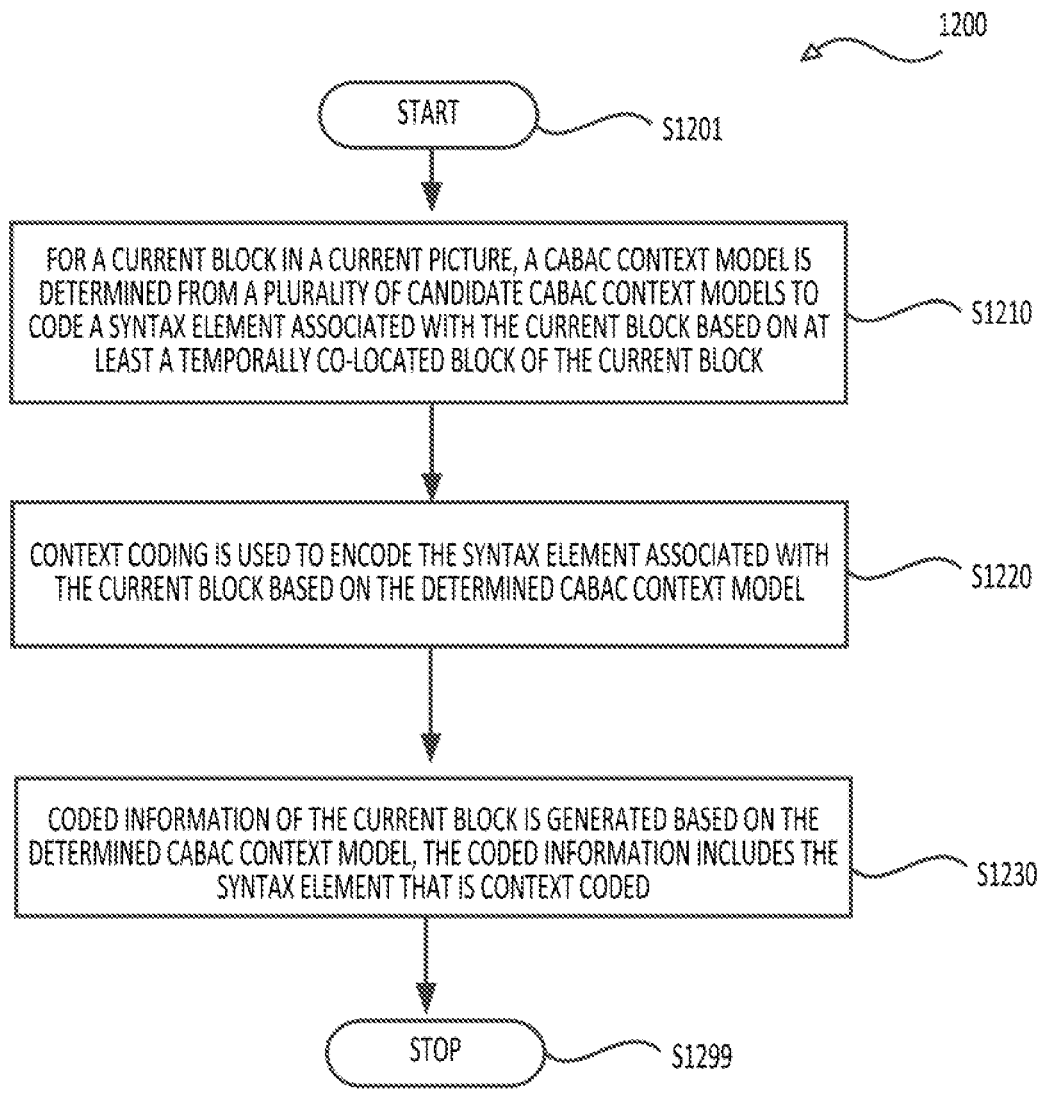
FIG. 12 shows a flow chart outlining an encoding process according to some embodiments of the disclosure.

FIG. 12 shows a flow chart outlining a process (1200) according to an embodiment of the disclosure. The process (1200) can be used in a video encoder. In various embodiments, the process (1200) is executed by processing circuitry, such as the processing circuitry that performs functions of the video encoder (103), the processing circuitry that performs functions of the video encoder (303), and the like. In some embodiments, the process (1200) is implemented in software instructions, thus when the processing circuitry executes the software instructions, the processing circuitry performs the process (1200). The process starts at (S1201) and proceeds to (S1210).

At (S1210), for a current block in a current picture, a CABAC context model is determined from a plurality of candidate CABAC context models to code a syntax element associated with the current block based on at least a temporally co-located block of the current block.

At (S1220), context coding is used to encode the syntax element associated with the current block based on the determined CABAC context model.

At (S1230), coded information of the current block is generated based on the determined CABAC context model, the coded information includes the syntax element that is context coded.

In some examples, the temporally co-located block is located in a reference picture of the current picture at same coordinates as the current block. In some embodiments, the CABAC context model is determined based on one or more subblocks located at pre-defined positions relative to the temporally co-located block. In an example, the CABAC context model is determined based on at least a first subblock at a middle position relative to the temporally co-located block and a second subblock at a bottom right position relative to the temporally co-located block.

In some examples, the CABAC context model associated with the syntax element is determined based on at least a spatially neighboring block and at least the temporally co-located block of the current block. In some embodiments, at least the spatially neighboring block and at least the temporally co-located block are scanned to determine a number of blocks in at least the spatially neighboring block and at least the temporally co-located block that satisfy a requirement, and the CABAC context model is determined based on the number of blocks that satisfy the requirement. In an example, the syntax element is a flag indicative of whether the current block is only intra coded or not, then at least the spatially neighboring block and at least the temporally co-located block are scanned to determine a number of blocks in at least the spatially neighboring block and at least the temporally co-located block that are intra coded, and the CABAC context model is determined based on the number of blocks.

It is noted that the syntax element can be one of an inter affine flag, a merge subblock flag, a local illumination compensation flag, a non-inter flag, a coding unit skip flag, a prediction mode flag, or an inter matrix-based intra-prediction (mip) flag.

Then, the process proceeds to (S1299) and terminates.

The process (1200) can be suitably adapted. Step(s) in the process (1200) can be modified and/or omitted. Additional step(s) can be added. Any suitable order of implementation can be used.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
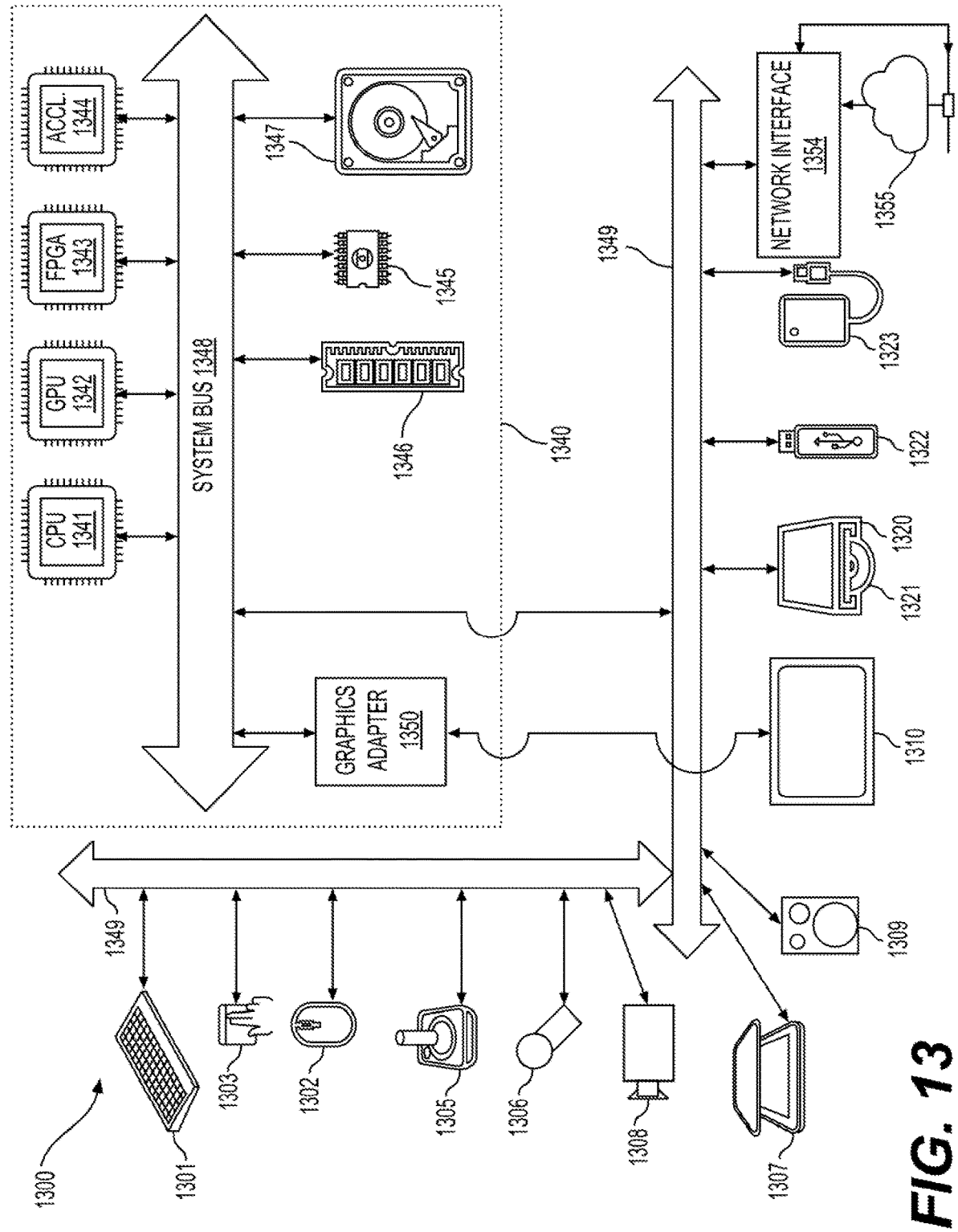
FIG. 13 is a schematic illustration of an exemplary computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding in a video decoder, the method comprising:
   receiving coded information of a current block in a current picture from a coded video bitstream, the coded information including a syntax element associated with the current block, the syntax element indicating a decoding parameter of the current block;
   scanning at least a spatially neighboring block and at least a temporally co-located block to determine a number of blocks in at least the spatially neighboring block and at least the temporally co-located block that satisfy a requirement;
   determining a context-based adaptive binary arithmetic coding (CABAC) context model associated with the syntax element based on the number of blocks that satisfy the requirement, the temporally co-located block being in a different picture from the current picture;
   decoding the syntax element based on the CABAC context model; and
   reconstructing the current block based on the syntax element that is decoded based on the CABAC context model.

2. The method of claim 1, wherein the temporally co-located block is located in a reference picture of the current picture at same coordinates as the current block.

3. The method of claim 2, wherein the determining the CABAC context model further comprises:
determining the CABAC context model based on one or more subblocks located at pre-defined positions relative to the temporally co-located block.

4. The method of claim 3, wherein the determining the CABAC context model further comprises:
determining the CABAC context model based on at least a first subblock at a middle position relative to the temporally co-located block and a second subblock at a bottom right position relative to the temporally co-located block.

5. The method of claim 1, wherein
the syntax element is a flag indicative of whether the current block is only intra coded or not
the scanning includes
scanning at least the spatially neighboring block and at least the temporally co-located block to determine the number of blocks in at least the spatially neighboring block and at least the temporally co-located block that are intra coded; and
the determining the CABAC context model includes determining the CABAC context model for deriving the flag based on the number of blocks.

6. The method of claim 1, wherein the syntax element is one of an inter affine flag, a merge subblock flag, a local illumination compensation flag, a non-inter flag, a coding unit skip flag, a prediction mode flag, or an inter matrix-based intra-prediction (mip) flag.

7. A method of processing visual media data, the method comprising:
processing a bitstream that includes the visual media data according to a format rule, wherein
the bitstream includes coded information of a current block in a current picture; and
the format rule specifies that:
the coded information includes a syntax element associated with the current block, the syntax element indicating a decoding parameter of the current block;
at least a spatially neighboring block and at least a temporally co-located block are scanned to determine a number of blocks in at least the spatially neighboring block and at least the temporally co-located block that satisfy a requirement;
a context-based adaptive binary arithmetic coding (CABAC) context model associated with the syntax element is determined based on the number of blocks that satisfy the requirement, the temporally co-located block being in a different picture from the current picture;
the syntax element is decoded based on the CABAC context model; and
the current block is reconstructed based on the syntax element that is decoded based on the CABAC context model.

8. The method of claim 7, wherein the temporally co-located block is located in a reference picture of the current picture at same coordinates as the current block.

9. The method of claim 8, wherein the format rule further specifies that:
the CABAC context model is determined based on one or more subblocks located at pre-defined positions relative to the temporally co-located block.

10. The method of claim 9, wherein the format rule further specifies that:
the CABAC context model is determined based on at least a first subblock at a middle position relative to the temporally co-located block and a second subblock at a bottom right position relative to the temporally co-located block.

11. The method of claim 7, wherein
the syntax element is a flag indicative of whether the current block is only intra coded or not, and
the format rule further specifies that:
at least the spatially neighboring block and at least the temporally co-located block are scanned to determine the number of blocks in at least the spatially neighboring block and at least the temporally co-located block that are intra coded; and
the CABAC context model for deriving the flag is determined based on the number of blocks.

12. The method of claim 7, wherein the syntax element is one of an inter affine flag, a merge subblock flag, a local illumination compensation flag, a non-inter flag, a coding unit skip flag, a prediction mode flag, or an inter matrix-based intra-prediction (mip) flag.

13. A method of video encoding in a video encoder, the method comprising:
generating coded information of a current block in a current picture, the coded information including a syntax element associated with the current block, the syntax element indicating a encoding parameter of the current block;
scanning at least a spatially neighboring block and at least a temporally co-located block to determine a number of blocks in at least the spatially neighboring block and at least the temporally co-located block that satisfy a requirement;
determining a context-based adaptive binary arithmetic coding (CABAC) context model associated with the syntax element based on the number of blocks that satisfy the requirement, the temporally co-located block being in a different picture from the current picture;
encoding the syntax element based on the CABAC context model; and
reconstructing the current block based on the encoding parameter.

14. The method of claim 13, wherein the temporally co-located block is located in a reference picture of the current picture at same coordinates as the current block.

15. The method of claim 14, wherein the determining the CABAC context model further comprises:
determining the CABAC context model based on one or more subblocks located at pre-defined positions relative to the temporally co-located block.

16. The method of claim 15, wherein the determining the CABAC context model further comprises:
determining the CABAC context model based on at least a first subblock at a middle position relative to the temporally co-located block and a second subblock at a bottom right position relative to the temporally co-located block.

* * * * *